July 31, 1956 — F. C. STULTS — 2,756,971
LIQUID MIXING APPARATUS
Filed Sept. 30, 1953
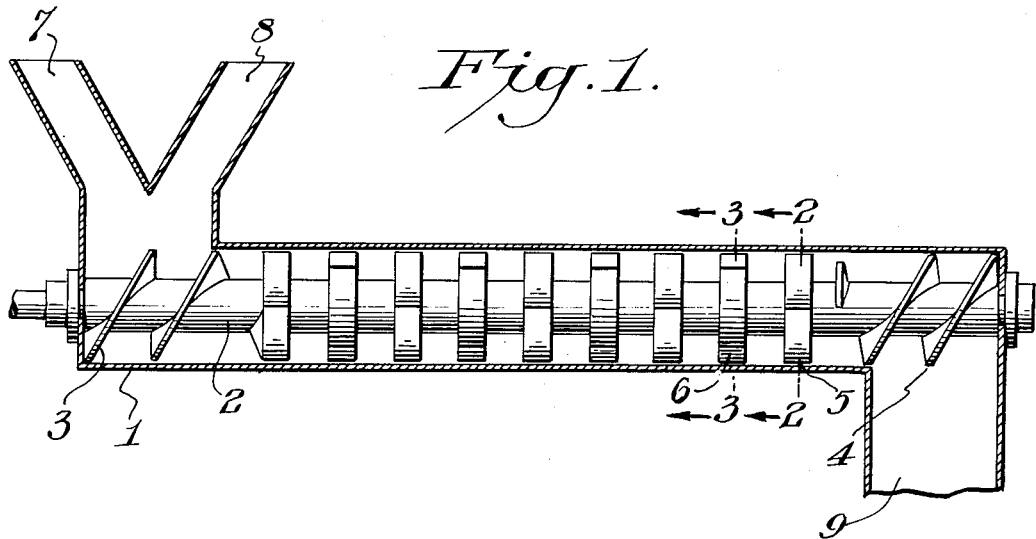
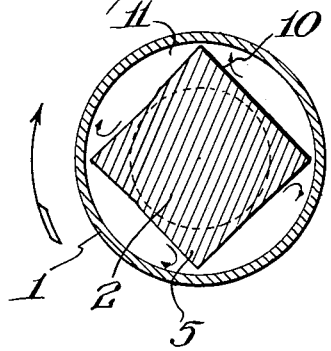
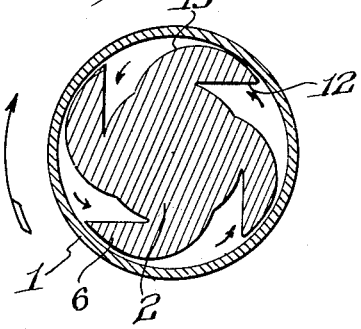
INVENTOR
Frederick Charles Stults
BY
ATTORNEY United States Patent Office 2,756,971
Patented July 31, 1956

2,756,971

LIQUID MIXING APPARATUS

Frederick Charles Stults, Richmond, Va., assignor to E. I. du Pont de Nemours and Company, Wilmington, Del., a corporation of Delaware Application September 30, 1953, Serial No. 383,280

3 Claims. (Cl. 259—9)

This invention relates to a mixing apparatus, and, more particularly, to a mixing apparatus suitable for blending viscous liquids.

In the normal course of producing continuous quantities of readily extrudable molten polymers, it is oftentimes necessary to blend or mix continuously flowing quantities of molten polymers originating from separate sources. Furthermore, in extruding these polymers into the form of films or filaments, it is required that the molten mass being extruded be homogeneous and have a substantially uniform viscosity. Hence, in order to blend continuously streams of molten polymer from separate sources. a continuous mixing apparatus is required to produce a homogeneous blend of relatively uniform viscosity. Of the many types of existing mixing apparatus, only a relatively few are designed for blending liquids of high viscosity; and none, so far as I am aware, is specifically adapted for the efficient and continuous blending of separate streams of molten polymer, such as polyethylene terephthalate, to form a molten polymer stream of uniform viscosity.

An object of the present invention, therefore, is to provide a mixing apparatus for continuously blending or mixing two or more individual streams of relatively highly viscous liquids. A more specific object is to provide a mixing apparatus for continuously blending or mixing individual streams of polymeric materials in molten form. Other objects will be apparent from the following description of the invention.

The above objects are accomplished by the apparatus of the present invention which, briefly stated, comprises an elongated cylindrical shell or vessel serving as a conduit for the passage of a liquid therethrough, said shell containing a driven shaft having mounted thereon or integral therewith a multiplicity of mixing vanes, alternate vanes functioning to force the moving liquid in a direction toward the internal peripheral surface of the shell, and the remaining vanes functioning to force the moving liquid in a direction toward the center of the shell.

The following description of the apparatus in its preferred embodiment should be read with reference to the accompanying drawings wherein:

Figure 1 is a side elevation view of the apparatus with the shell cut away to show the disposition of the driven shaft and mixing vanes thereon;

Figure 2 is a sectional view of the same apparatus along line 2—2 of Figure 1; and Figure 3 is a sectional view of the same apparatus taken along line 3—3 of Figure 1.

Referring to Figure 1, an embodiment of the present apparatus comprises a cylindrical shell 1, fabricated from a suitable metal such as stainless steel, and a solid cylindrical metal shaft 2, rotatable within the cylindrical shell 1 and positively driven by any conventional drive means (not shown). The shaft 2 has screw flights 3 and 4 integral therewith or mounted thereon at each end of the shaft, these being optional, and a multiplicity of each of mixing vanes 5 and 6 alternately mounted thereon or integral therewith and formed to push the viscous mass outwardly toward the internal surface of the cylinder and inwardly toward the shaft, respectively. The outside diameters of the screw flights and mixing vanes on shaft 2 are such as to provide close clearance between these components and the inside surface of the shell 1. Independent streams of viscous liquids, for example, molten thermoplastic polymers from independent sources, are forced or pumped into the mixing apparatus at 7 and 8; and these streams are pumped through the cylindrical shell 1, blended or mixed during movement therethrough; and the blended or mixed liquids are conducted from the apparatus at 9. The shaft 2 may be rotated at any suitable rate. In general, however, the shaft should not be rotated at high rates.

Figure 2 illustrates the cross-sectional configuration of the mixing vane 5 designed to push the viscous mass toward the internal surfaces of the shell 1 when rotated in the direction as indicated. The vane is comprised of a multiplicity of protuberances, each having a substantially flat leading edge 10 which lies in a plane substantially tangent to the peripheral surface of the shaft and having a trailing edge 11 which tapers substantially along a straight line back to a point on the peripheral surface of the shaft. The leading edge represents the surface which applies a pressure upon the viscous liquid and tends to force the liquid in a direction toward the internal surfaces of the shell, this being indicated by the arrows. The trailing edge 11 of the protuberance is somewhat convex in the particular embodiment shown. In general, however, the trailing edge may be tapered back along a substantially straight line toward the peripheral surface of the shaft.

Figure 3 illustrates the configuration of the mixing vane 6 designed to draw or channel the viscous liquid toward the center of the cylindrical shell 1. This vane comprises a multiplicity of protuberances, each having a leading edge 12 which, in combination with a segment of the peripheral surface of the shaft, forms a substantially V-shaped channel serving to draw liquid material toward the center or longitudinal axis of the shell, the leading edge of each protuberance lying in a plane which is substantially tangent to the peripheral surface of the shaft, and a trailing edge 13 substantially convex and tapering back to the peripheral surface of the shaft.

The mixing vanes may be made integral with the shaft; i. e., the shaft and vanes may be cut or machined from a solid metal rod of suitable diameter; or the vanes may be independently fabricated and thereafter connected or attached to a metal rod serving as a shaft. Furthermore, the number of protuberances which make up a mixing vane is entirely optional, this depending upon the conditions of operation and nature and quantity of the liquids being blended.

It should be understood that the spacing between adjacent mixing vanes may be varied with the particular conditions under which the mixer is to be operated and with the viscosity and nature of the particular liquids being blended or mixed. Furthermore, the clearance between the protuberances of the individual mixing vanes and the internal surface of the shell or vessel may also be varied with the conditions of operation and the nature of the materials being handled. Usually, the clearance will be relatively close; for example, the clearance may be as close as 0.1" or as great as 0.25" when employing a shell having an inside diameter of 4", the length of the shell being about 56".

The shaft 2, as illustrated, contains two short screw flights 3 and 4 which may be employed for the purpose of exerting a pumping action upon the liquid being mixed. However, as previously stated, this arrangement is strictly optional and will depend upon the pressure being applied to the material at the inlet end. In other words, one or both of the screw flights may be replaced by additional mixing vanes.

In the operation of the present mixing apparatus, with alternate mixing vanes serving to push the viscous liquid toward the internal peripheral surface of the shell and the remaining mixing vanes serving to draw or channel the liquid into the center of the shell, longitudinal movement of any particular portion or mass of liquid is constantly being disturbed; i. e., it is not possible for any static layers of liquid to move a distance greater than that between adjacent mixing vanes without being disturbed or sheared by the action of the vanes. In general, the relatively viscous liquid must follow a rather tortuous path through the mixing apparatus; and, consequently, a substantially homogeneous liquid is withdrawn from the exit end.

The following example illustrates the efficiency of a mixing apparatus within the scope of the present invention with regard to mixing independent streams of relatively viscous molten polyethylene terephthalate maintained at elevated temperatures:

Two individual streams of molten polyethylene terephthalate were continuously fed into a mixing apparatus of the type indicated in Figure 1. One stream of molten polymer was at a temperature of about 288° C. and had an intrinsic viscosity of 0.56. This stream was fed in at a rate of 100 pounds per hour. A second stream, at a temperature of about 275° C. and an intrinsic viscosity of 0.58, was fed into the mixer at a rate of 140 pounds per hour. The mixer was jacketed to provide for heating the molten polymer during mixing. Steam was employed to maintain the mixer at a temperature of about 280° C. The mixer rotor was rotated at a rate of about 20 revolutions per minute. The blended or mixed polymer was formed into film, and longitudinal strips were cut from the film; and the intrinsic viscosity of polymer strips was measured. The intrinsic viscosity of the polymer in film form was in all cases between 0.57 and 0.58, thus indicating uniform blending of the initial polymer streams.

Although the apparatus of the present invention is particularly useful for blending molten thermoplastic polymers, for example, thermoplastic polymers such as the polyamides, polyesters such as polyethylene terephthalate, polyethylene, etc., the present apparatus may also be employed efficiently for mixing other types of relatively viscous materials such as corn syrup, relatively viscous paints, etc. It should also be emphasized that the present mixing apparatus may be employed in a single pipe line handling a rough blended mixture of viscous polymers. The mixer in this case serves to blend the polymer more uniformly.

The advantages of using the present apparatus are greatest when it is employed as a component in a continuous process. Although the rate of flow of viscous liquid through the apparatus will not be high, the necessity of handling large volumes of material per unit time will require the fabrication of an apparatus having a larger shell, and, consequently, mixing vanes of greater diameters. Furthermore, the efficiency of the mixing action of the present apparatus appears to be optimum when the mixing vanes are rotating at relatively low rates. All specifications relating to the general size of component parts of the apparatus, however, will depend chiefly upon the conditions of operation and quantity and nature of the material being handled, e. g., temperature, volume of material per unit time, pressure at which the material is forced into the apparatus, viscosity, and number of independent streams of material being blended.

I claim:

1. A mixing apparatus comprising in combination an elongated cylindrical vessel having liquid inlet means in one end thereof and liquid outlet means in the opposite end thereof, a driven shaft in said housing and extending longitudinally thereof and a multiplicity of vanes on said shaft in spaced relationship, alternate vanes being each comprised of a multiplicity of protuberances each having a substantially flat leading edge which lies in a plane substantially tangent to the peripheral surface of the shaft and having a trailing edge which tapers substantially along a straight line back to a point on the peripheral surface of the shaft, each of the remaining vanes being comprised of a plurality of protuberances each having a leading edge which in combination with a segment of the peripheral surface of the shaft forms a substantially V-shaped channel serving to draw liquid material toward the longitudinal axis of said vessel, the leading edge lying in a plane which is substantially tangent to the peripheral surface of the shaft and a trailing edge substantially convex and tapering back to the peripheral surface of the shaft.

2. The apparatus of claim 1 wherein the shaft is provided with a screw flight adjacent one end of said liquid inlet and liquid outlet means.

3. The apparatus of claim 1 wherein the shaft is provided with screw flights adjacent said liquid inlet and said liquid outlet means.

References Cited in the file of this patent

UNITED STATES PATENTS

| | | |
|---|---|---|
| 42,029 | Thompson | Mar. 22, 1864 |
| 638,743 | McLellan | Dec. 12, 1899 |
| 989,126 | Currie | Apr. 11, 1911 |
| 1,256,854 | Wickliffe | Feb. 19, 1918 |
| 2,626,856 | Alles | Jan. 27, 1953 |
| 2,633,073 | Allan | Mar. 31, 1953 |

FOREIGN PATENTS

| | | |
|---|---|---|
| 556,349 | Great Britain | Sept. 30, 1943 |